United States Patent [19]

Johnson et al.

[11] 4,375,669

[45] Mar. 1, 1983

[54] ELECTRONIC CONTROL SYSTEM FOR A GLASSWARE FORMING MACHINE

[75] Inventors: William E. Johnson, Toledo; Thomas F. Michalski, Maumee; William H. Ryan, Toledo, all of Ohio

[73] Assignee: Owens-Illinois, Inc., Toledo, Ohio

[21] Appl. No.: 204,133

[22] Filed: Nov. 5, 1980

[51] Int. Cl.[3] .............................................. G06F 15/46
[52] U.S. Cl. .................................... 364/473; 65/160; 65/163
[58] Field of Search ............ 364/473; 65/29, 158–160, 65/163, 164

[56] References Cited

U.S. PATENT DOCUMENTS

| Re. 29,886 | 1/1979 | Dembiak et al. | 364/473 |
|---|---|---|---|
| 3,573,016 | 3/1971 | Rees | 65/160 |
| 4,090,241 | 5/1978 | Houston | 364/473 |
| 4,145,204 | 3/1979 | Farkas et al. | 364/473 |
| 4,152,134 | 5/1979 | Dowling | 65/163 |
| 4,247,317 | 1/1981 | Wood et al. | 65/164 |

OTHER PUBLICATIONS

Kwiatkowski et al.; "Electronic Timing of Automatic Glass-Blowing Machines"; IEEE Trans. on Ind. Applications; vol. IA-12, No. 2, pp. 165–171, 1976.

*Primary Examiner*—Errol A. Krass
*Attorney, Agent, or Firm*—Gerald T. Welch; Myron E. Click; David H. Wilson

[57] ABSTRACT

A control system for a glassware forming machine determines the machine speed in accordance with the physical characteristics of the molten glass and the type of glassware being formed. The control system is loaded with timing data representing predetermined forming steps and a machine cycle speed and a control program for generating control signals to the machine forming mechanisms for forming the selected type of glassware. As the machine is operated, one or more physical characteristics of the molten glass entering the machine are sensed and utilized by the control system to adjust the machine speed to an optimum value. The control system also can utilize signals representing the operation of the forming mechanisms to adjust the timing within the machine cycle.

11 Claims, 9 Drawing Figures

ELECTRONIC CONTROL SYSTEM FOR A GLASSWARE FORMING MACHINE

BACKGROUND OF THE INVENTION

1. Field of the Invention

The present invention relates generally to control systems for glassware forming machines and in particular to a timing and speed control system which is responsive to the physical properties of the gobs of molten glass.

2. Description of the Prior Art

The individual section glassware forming machine is well known and includes a plurality of sections, each having means for forming glassware articles in a timed predetermined sequence of steps. Typically, the sections are fed from a single source of molten glass which forms gobs of the molten glass. The gobs are distributed to the individual sections in an ordered sequence. The individual sections are operated in synchronism at a relative phase difference such that one section is receiving a gob while another section is delivering a finished glassware article to a conveyor and one or more other sections are performing various ones of the intermediate steps.

The forming means in each section are typically operated from pneumatic motors or actuators. In early prior art machines, the pneumatic motors were controlled by a valve block which, in turn, was controlled by a timing drum driven from a line shaft which synchronized all parts of the machine. The timing drum was later replaced with an electronic control means including a master unit which was responsive to a clock pulse generator and a reset pulse generator, both generators being driven by the line shaft. Such a control system is disclosed in U.S. Pat. No. 3,762,907. Other prior art control systems utilized digital computers with memory and associated program storage for providing a means for programming groups of related functions in accordance with certain boundary events. Such a control system is disclosed in U.S. Pat. No. 3,905,793.

U.S. Pat. No. 4,108,632 discloses an electronic control system utilizing a programmed controller and a pulse generator for generating a real time base for the forming operations. Inputs to the controller are a sensor for detecting the release of the gob from the gob forming means, a temperature sensor for detecting the passage of the gob into the blank station, and a pressure sensor for detecting the start of the parison forming. The controller utilizes the gob release signal to determine the end/start of successive forming cycles, the temperature signal to start the parison forming steps and the pressure signal to determine the duration of the parison forming operation. The speed of the gob forming and releasing is controlled by an electric motor running at a predetermined speed.

A later prior art control system includes a machine supervisory control means connected to a separate section control means for each of the individual sections and to a data storage means. The machine supervisory control means loads each section control means with a control program and timing data from the storage means for forming a specific article of glassware. The machine supervisory control means also obtains the current timing data from each of the section control means at predetermined intervals and sends it to the storage means. Individual forming operation times can be adjusted while the machine is running. Such a control system is disclosed in U.S. Pat. No. 4,152,134.

SUMMARY OF THE INVENTION

The present invention concerns an electronic control system for an individual section glassware forming machine. The machine has means for forming gobs of molten glass, a plurality of individual glassware forming sections, and means for feeding the gobs of molten glass to the glassware forming section. Each glassware forming section includes forming means for forming the glassware articles in a series of predetermined forming steps in response to a plurality of control signals. The machine also includes an electronic control means for generating the control signals.

The control means is responsive to certain physical properties of the gobs of molten glass, such as gob temperature and weight, which are important to the forming process. The control means includes a machine speed control means which adjusts the speed of the machine to an optimum value according to the physical property data and other predetermined factors, such as the type of glassware being manufactured.

It is an object of the present invention to provide a control system which increases the efficiency and accuracy of individual section glassware forming machine.

It is another object of the present invention to provide a control system which automatically adjusts the speed of glassware forming machines according to the physical properties of the molten glass.

It is a further object of the present invention to provide an electronic control system for a glassware forming machine which operates on a real time basis.

Other objects and advantages of the invention will be apparent to those skilled in the art from the following detailed description of the preferred embodiment of the invention when considered in the light of the accompanying drawings.

DESCRIPTION OF THE PREFERRED EMBODIMENT

Figure 1:
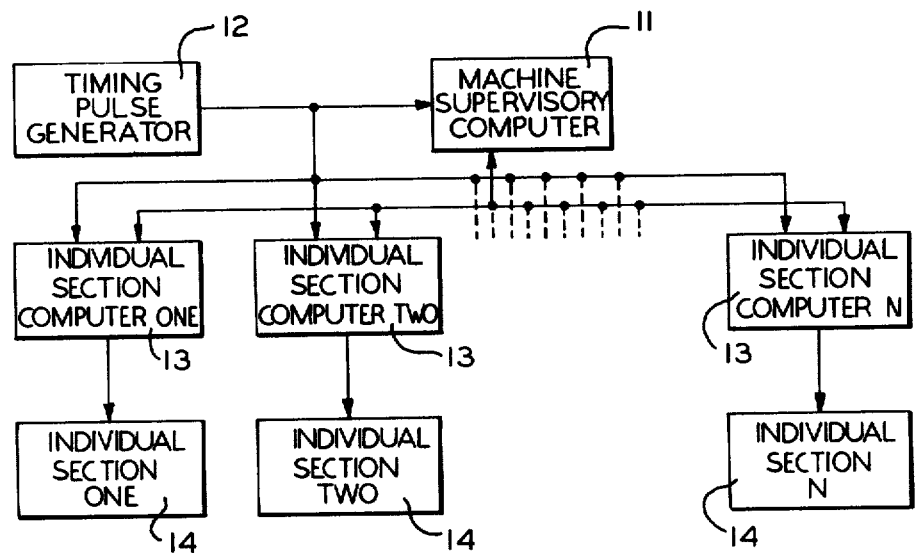
FIG. 1 is a block diagram of a prior art computer controlled individual section glassware forming machine.

There is shown in FIG. 1 a block diagram of an individual section glassware forming machine and associated electronic control system which is more fully described in U.S. Pat. No. 4,152,134. A machine supervisory computer 11 and a plurality of individual section computers 13 receive a train of timing pulses from a timing pulse generator 12. The generator 12 typically can be one of the devices disclosed in U.S. Pat. Nos. 4,145,204 and 4,145,205. The machine supervisory computer 11 is connected to the plurality of individual section computers 13, one through N, each of which is connected to an associated one of a plurality of individual sections 14, one through N, of the glassware forming machine.

The timing pulse generator 12 generates a clock signal to the machine sypervisory computer 11 and the individual section computer 13, thus providing a reference for timing the machine cycle and the sequence of steps to be performed by the individual section computers 13. Typically, the machine timing is expressed in degrees and a machine cycle is 360° in length. Thus, 360 clock pulses or some multiple thereof comprise one machine cycle. The cycle for each individual section 14 is also 360°, but the cycle for all the sections can be offset from the start of the machine cycle by a different number of degrees to compensate for the difference in gob delivery time to each section. The timing pulse generator also generates a reset signal after 360° of clock pulses, which is utilized by the machine supervisory computer 11 and the individual section computer 13 to define the end and beginning of successive machine cycles.

The prior art control systems utilize some electrical or mechanical sub-system of the glassware forming machine, such as the machine motor shaft, the motor electrical input signal, or the movement of the gob shears to synchronize the timing of the forming operations with the machine speed. From the synchronization point, the various operations of the forming process are controlled by either a machine cycle or real time control algorithm. When the machine cycle control algorithm is utilized, the time duration of each operation depends upon the number of counts produced by a counter, for example, which counts the number of rotations made by the main shaft of the machine. When the real time control algorithm is utilized, a computer measures the time duration according to a predetermined number of interval clock pulses. In either event, the timing of the forming process operations is servient to the speed of the glassware forming or other arbitrary standards.

The dependence of the process timing from the speed of the glassware forming machine presents a problem when the physical characteristics of the molten glass change. Certain forming operations, especially in the initial forming stages, have critical time durations which prevent production defects, such as settle wave, in the formed glass. These critical time durations vary as the physical characteristics of the molten glass change. One of the most important physical characteristics of the molten glass in a glass forming process is the temperature of the glass. The glass temperature affects many crucial variables in the forming process, such as gob weight, gob delivery time, and mold equipment temperature. Thus, as the temperature of the molten glass changes, the time duration of the forming operations must also change. However, because the actual time duration of each operation is controlled by the speed of the glassware forming machine, it is difficult to alter. The use of a real time clock to control the forming operations is known in the art, but does not solve the problem of altering the time duration of critical forming operations according to changes in the temperature of the molten glass.

Figure 2:
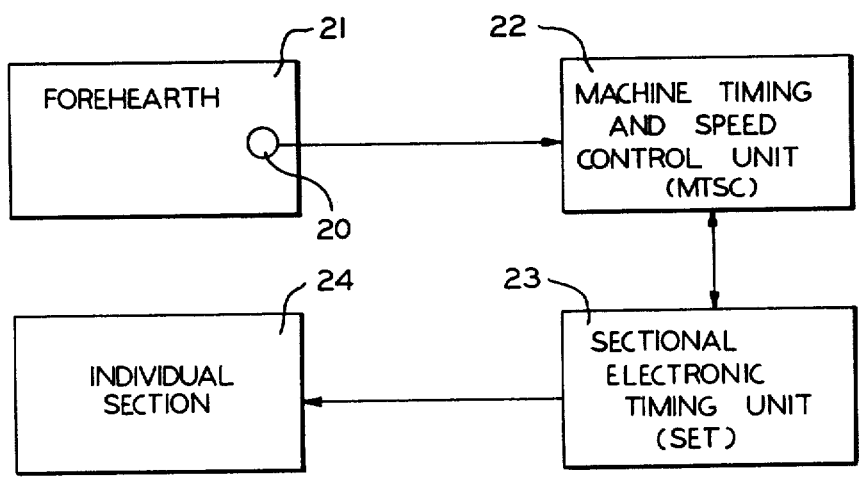
FIG. 2 is a simplified block diagram of a control system for one section of an individual section glassware forming machine according to the present invention.

The present invention provides a solution by reversing the master-slave role and making the process timing dominant over the speed of the glassware forming machine. There is shown in FIG. 2, a simplified block diagram of an individual section glassware forming machine and associated control system according to the present invention. A sensor 20, located in a forehearth 21 of a furnace, generates a signal representing a physical characteristic of the molten glass, which is fed to a machine timing and speed control unit (MTSC) 22. The sensor can be located in the area known as the "bowl" or any other suitable area. The machine timing and speed control unit 22 generates timing pulses and alters the speed of the glassware forming machine to a predetermined optimum speed according to the physical characteristic of the molten glass. The MTSC 22 generates timing signals to a sectional electronic timing unit 23. The sectional electronic timing unit (SET) 23 generates control signals to an individual section 24 of the glassware forming machine. Although only one SET unit 23 is shown, it will be appreciated that any number of individual sections can be so controlled without departing from the scope of the present invention.

Figure 3:
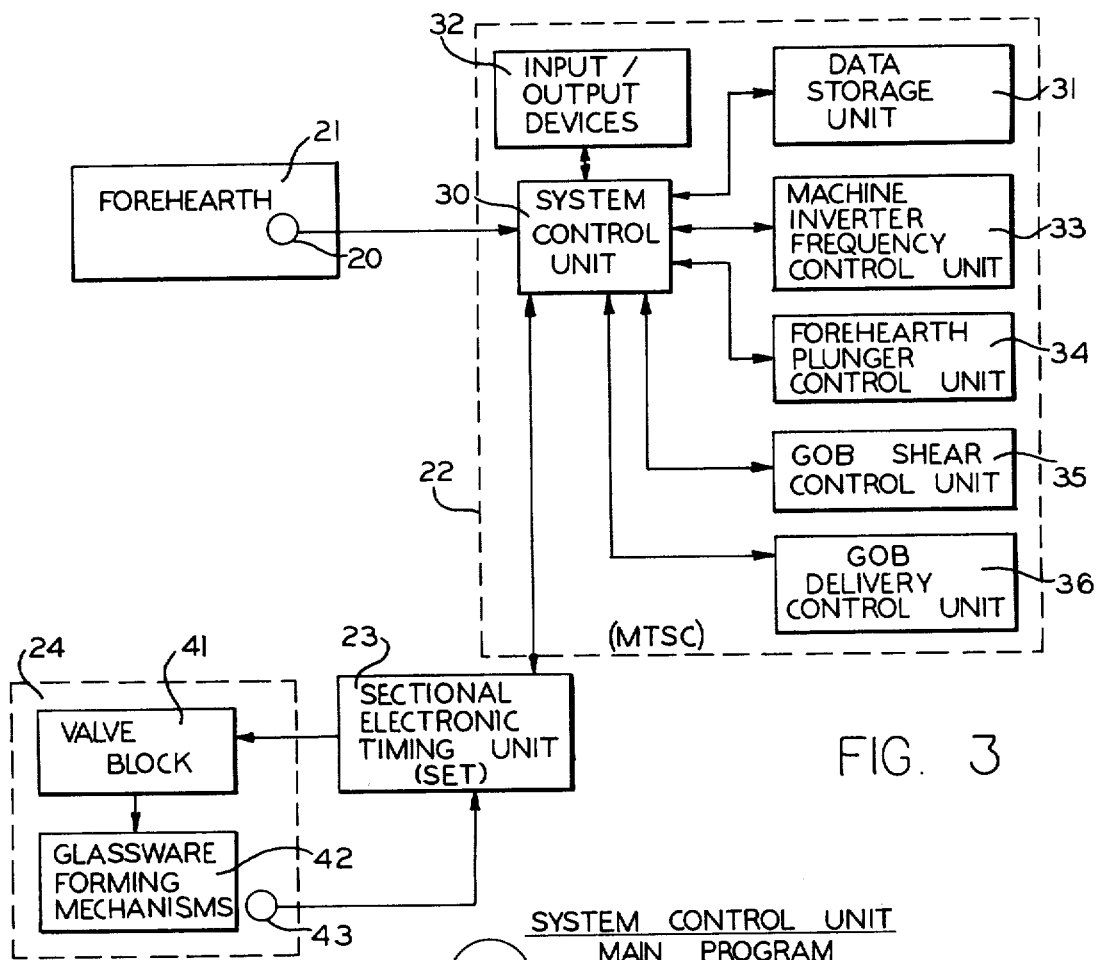
FIG. 3 is a more detailed block diagram of the control system and individual section of FIG. 2.

FIG. 3 is a more detailed block diagram of the control system of FIG. 2. In the preferred embodiment of the invention, the forehearth sensor 20 senses the temperature of the molten glass within the forehearth 21. However, other important physical properties can be measured, such as glass composition or viscosity, to determine an optimum machine speed.

The MTSC unit 22 includes a system control unit 30 which receives the signal generated by the forehearth sensor 20. A data storage unit 31 and an input/output device 32 are both connected to the system control unit 30 by a pair of bidirectional lines. The system control unit 30 can be an LSI-11 computer manufactured by Digital Equipment Corporation of Maynard, Mass. The data storage Unit 31 can be a RXV 11 Floppy Disk Drive and the input/output device 32 can be a LA36 DECwriter Teleprinter, both manufactured by Digital Equipment Corporation of Maynard, Mass.

The data storage unit 31 contains the control programs for the glassware forming machine. An operator uses the input/output device 32 to select the particular control program which is to be loaded into the system control unit 30. The data storage unit 31 can also be utilized to store current timing and control data so that in the event of an interuption, such as a power failure, the data is available and can be reloaded into the system control unit 30 to quickly resume operation. The control programs for a particular type of glassware contain data concerning the actual time duration of the forming operations and how those time durations should vary as the temperature of the molten glass changes.

The system control unit 30 is also connected to a machine inverter frequency control unit 33, a forehearth plunger control unit 34, a gob shear control unit 35, and a gob delivery control unit 36. These units are well known in the art and control the delivery of the gobs of molten glass to the glassware forming section and the speed of the glassware forming machine. The system control unit 30 generates a plurality of speed control signals to the speed control units 33, 34, 35, and 36 in response to the physical characteristic signals received by the system control unit 30 from the forehearth sensor 20. For example, as the temperature of the molten glass in the forehearth increases, the flow of the glass will become more fluid. To maintain a constant gob size, the gob shears will have to cut the gobs at slightly shorter intervals. The system control unit 30 will, in accordance with preprogrammed instructions, alter the actions of the forehearth plunger and the gob shears by generating signals to the respective control units 34 and 35 so as to maintain a constant gob size. The gob delivery control unit 36 and the machine inverter frequency control unit 33 will receive similar speed adjustment signals from the system control unit 30. Each of the speed control units 33, 34, 35, and 36 generates a signal representing the actual speed of the particular unit which is fed back to the system control unit 30 to monitor response to a given control signal.

The system control unit 30 is utilized to load the control programs and timing data into the SET unit 23 in response to the physical characteristic signal received from the forehearth sensor 20. In the illustrated embodiment, the SET unit 23 can be an 8086 microcomputer manufactured by Intel Corporation of Santa Clara, Calif. The system control unit 30 loads the SET unit 23 with the control programs stored in the data storage device 31 and generates timing signals which vary according to the temperature of the molten glass in the forehearth 21. The SET unit 23 utilizes the timing signals to generate a set of control signals to a valve block 41 in the individual section 24. The valve block 41 is connected to control a plurality of glassware forming mechanisms 42. The control signals generated by the SET unit 23 determine the sequence and duration of each operation in the forming process to be performed by the glassware forming mechanisms 42.

The SET unit 23 can also receive signals from one or more section sensors 43. The section sensors 43 can be utilized to determine exact timing points of local events that can include the arrival of the gob at the entrance of the mold and the application of pressure in a forming operation. Such sensors 43 increase the accuracy of the process by informing the SET unit 23 of the exact timing points for critical operations. Thus, the actual time duration of a given operation can be accurately determined by the SET unit 23 and utilized to correct the timing of the control signals.

Figure 4:
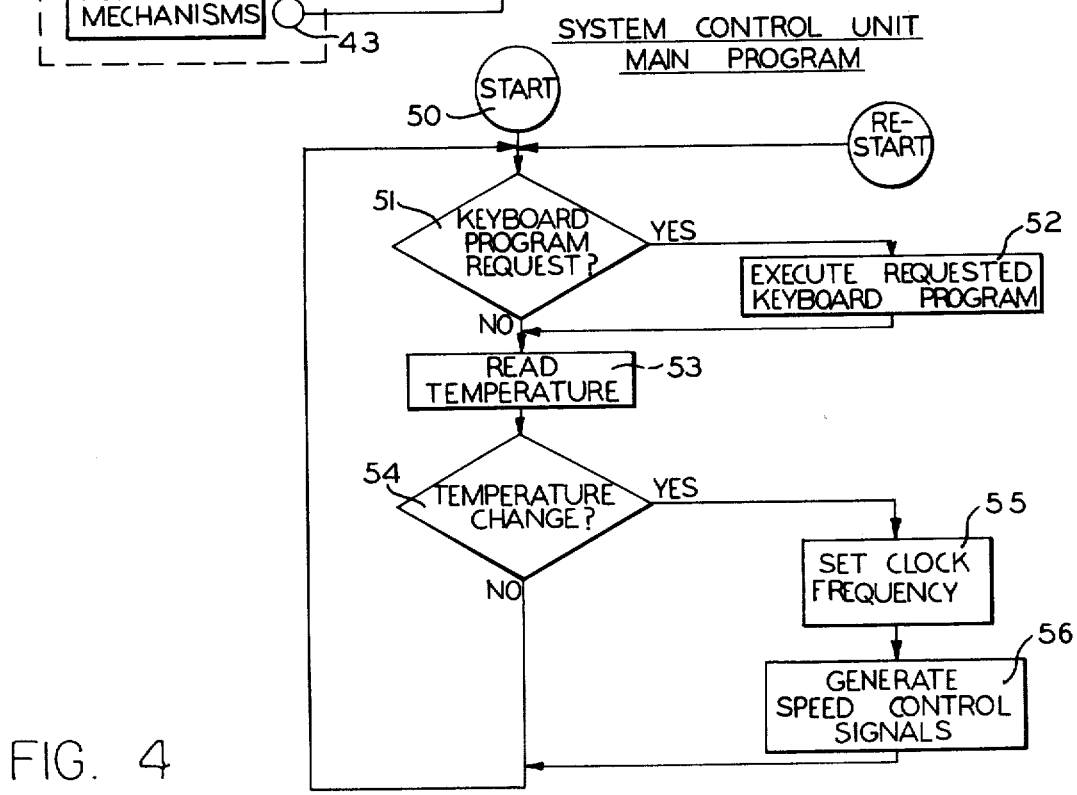
FIGS. 4 through 8 are flow diagrams of programs run by the system control unit of FIG. 3 to operate a glassware forming machine.

There is illustrated in FIG. 4 a simplified flow diagram of the main program for the system control unit 30. The program is initiated at a circle START 50 and immediately enters a decision point KEYBOARD PROGRAM REQUEST? 51 to check for any request to run a keyboard program that may have been entered by the machine operator. If there is such a request, the program branches at YES to a processing point 52. The processing point EXECUTE REQUEST KEYBOARD PROGRAM 52 represents a set of instructions directing the system control unit 30 to execute the requested program. The program then returns to a processing point READ TEMPERATURE 53 in the main program. If there is no requested keyboard program, the main program branches from the decision point 51 at NO and enters the processing point READ TEMPERATURE 53, which instructs the system control unit 30 to read the signal of the forehearth sensor 20 representing the temperature of the molten glass in the forehearth 51.

The program then enters the decision point TEMPERATURE CHANGE? 54. If the glass temperature has changed by more than a predetermined amount, the program branches at YES to a processing point SET CLOCK FREQUENCY 55 which represents a set of instructions directing the system control unit 30 to set the frequency of the system clock according to the amount of change in glass temperature. The program enters another processing point GENERATE SPEED CONTROL SIGNALS 56 directing the system control unit 30 to generate the speed control signals to the machine inverter frequency control unit 33, the forehearth plunger control unit 34, the gob shear control unit 35, and the gob delivery control unit 36. The program then returns to the beginning of the main program. If the glass temperature has changed by less than the predetermined amount, the program branches from the decision point 54 at NO to the beginning of the main program. It should be noted that all of the keyboard programs run on the lowest priority and can be interrupted by any other control program.

Figure 5:
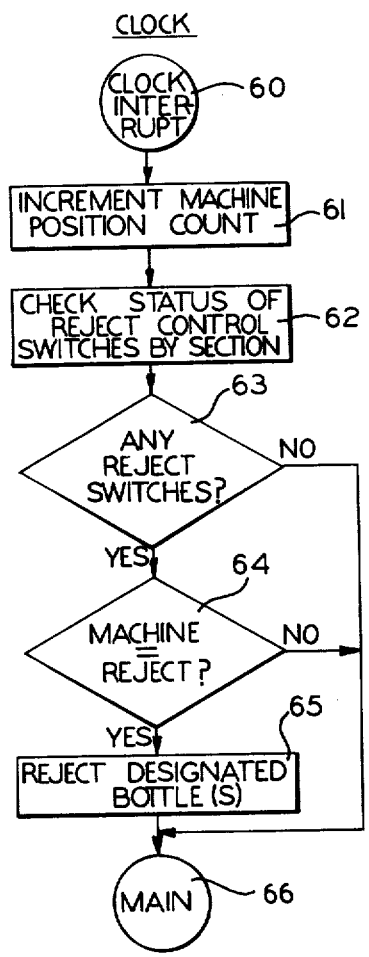

In addition to the keyboard programs initiated with the input/output device 32, the system control unit 30 is also responsible for running other control programs, all of which have a higher priority than the keyboard programs. A clock interrupt program has the highest priority and is shown in the flow diagram of FIG. 5. A clock interrupt is generated each time a timing pulse is generated by the system clock. If the system control unit 30 is running a keyboard program when the clock interrupt is generated, the keyboard program is interrupted and the clock interrupt is serviced before returning to the keyboard program. The clock interrupt program is initiated at a circle labeled CLOCK INTERRUPT 60 and then enters a processing point INCREMENT MACHINE POSITION COUNT 61 to update a count total representing the position of the machine in the machine cycle. Next the program enters a processing point CHECK STATUS OF REJECT CONTROL SWITCHES BY SECTION 62 which includes instructions for checking the status of reject control switches on a reject control panel (not shown) by section. The program enters a decision point ANY REJECT SWITCHES? 63 to determine if any bottles have been designated for rejection. If any of the reject control switches are actuated, the program branches at YES to a decision point MACHINE=REJECT? 64 wherein the system control unit 30 compares the current machine position count total with the reject synchronization value for each individual section. If they are equal, the program branches at YES to a processing point REJECT DESIGNATED BOTTLE(S) 65 which includes instructions for generating a reject signal to a bottle reject station (not shown) such that the designated bottle will be rejected. The clock interrupt program then returns to the main program from MAIN 66 at the point the main program was interrupted as is the case when the program branches at NO from the ANY REJECT SWITCHES? 63 decision point when no switches are actuated or when the program branches at NO from the MACHINE=REJECT? 64 decision point when the machine position count total is not equal to the reject synchronization value.

Figures 6, 7:
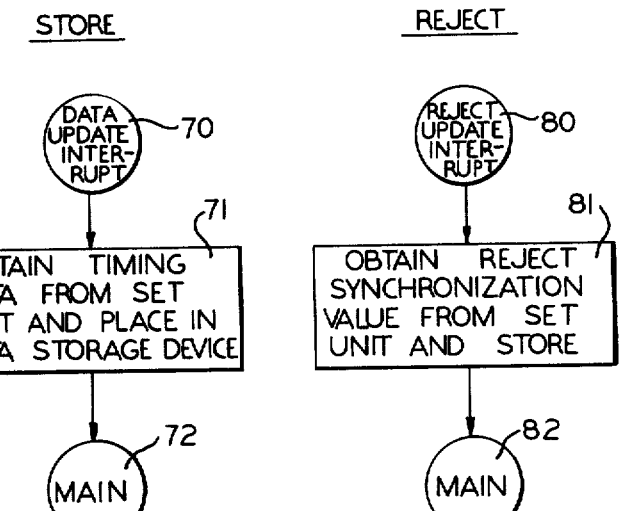

Approximately every five minutes, the system control unit 30 executes a store program shown in FIG. 6 to update the current section timing data for each individual section which is stored in the data storage device 31. The store interrupt is initiated at a circle DATA UPDATE INTERRUPT 70 and enters a processing function OBTAIN TIMING DATA FROM SET UNIT AND PLACE IN DATA STORAGE DEVICE 71. After the current timing data has been stored, the program returns to the main program from MAIN 72.

There is shown in FIG. 7 a reject program that is executed by the system control unit 30 approximately every one minute to update the reject synchronization values. The reject program is initiated at a circle REJECT DATA INTERRUPT 80 and enters a processing point OBTAIN REJECT SYNCHRONIZATION VALUE FROM SET UNIT AND STORE 81 which includes instructions for reading and storing the current reject synchronization values for the SET unit 23. The reject program then returns to the main program from a circle MAIN 82. The stored values are utilized in the comparison with the machine position performed at the decision point MACHINE=REJECT? 64 of FIG. 5.

Figure 8:
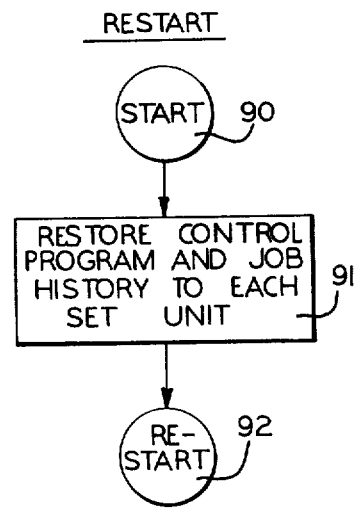

If a power failure occurs, the volatile register contents of the system control unit 30 and the SET units 23 will be lost. There is shown in FIG. 8 a flow diagram which indicates the steps taken by the system control unit 30 after a power failure recovery. A restart program is initiated at a circle START 90. Next, a processing point RESTORE CONTROL PROGRAM AND JOB HISTORY TO EACH SET UNIT 91 restores the SET unit 23 with the control programs and timing data with which they were loaded before the power failure. Then, the restart program returns to the main program from a circle MAIN 92.

Figure 9:
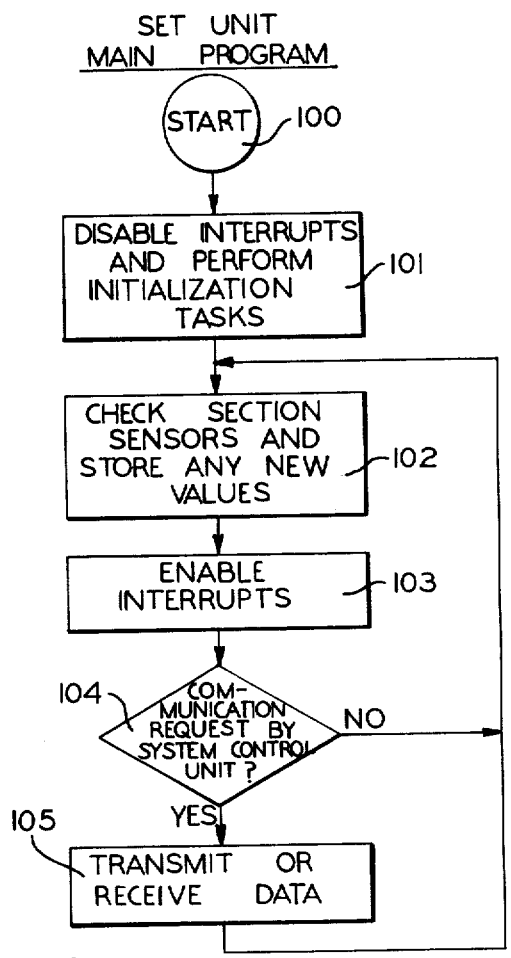
FIG. 9 is a flow diagram of a program run by the sectional electronic timing unit of FIG. 3 to operate an individual section of the glassware forming macine.

There is shown in FIG. 9 a simplified flow diagram for the main program for the SET unit 23. The main program is initiated at a circle START 100 and enters a processing point DISABLE INTERRUPTS AND PERFORM INITIALIZATION TASKS 101. Next, the program enters a processing point CHECK SECTION SENSORS AND STORE ANY NEW VALUES 102 which include instructions for checking the section sensor 43 for exact timing points of the local events in each individual section. The program enters another processing point ENABLE INTERRUPTS 103 which includes instructions to enable the SET unit 23 to respond to the clock pulses generated by the system control unit 30. The program then enters a decision point COMMUNICATION REQUEST BY SYSTEM CONTROL UNIT? 104. If the system control unit 30 has requested to either transmit data to or receive data from the SET unit 23, the program branches at YES to a processing point TRANSMIT OR RECEIVE DATA 105 which includes instructions for the SET unit 23 to communicate with the system control unit 30. The program then returns to the processing point CHECK SECTION SENSORS . . . 102 and continues to loop. If no communication request has been made by the system control unit, the program branches from the decision point 104 at NO and returns to the processing point CHECK SECTION SENSORS . . . 102.

The optimum speed of the machine will be that speed at which the highest production rate is achieved for a given quality of glassware. The relationship between the physical characteristic of the molten glass which is being sensed and the optimum speed can be determined through a quantitative analysis of the particular machine. Once the relationship has been determined for a particular machine, it can be defined in terms of a table of values, or a formula, or an electrical circuit, or any other convenient form. With respect to the control system shown in FIGS. 2 and 3, the relationship is incorporated in the control program for the MTSC unit 22 for setting the speed of the machine.

In accordance with the provisions of the patent statutes, the principle and mode of operation of the invention have been explained and illustrated in its preferred embodiment. However, it must be understood that the invention may be practiced otherwise than as specifically illustrated and described without departing from its spirit or scope.

What is claimed is:

1. In a glassware forming machine having means responsive to a speed control signal for forming and distributing gobs of molten glass to a plurality of individual glassware forming sections, glassware forming means in each of the individual sections for forming glassware articles from the gobs of the molten glass in a series of predetermined forming steps in response to a plurality of control signals, and control means for generating the speed signal and the control signals, the control means comprising:

a source of a signal representing a physical characteristic of the gobs of molten glass;

means responsive to said physical characteristic signal for generating a speed control signal varying in response to changes in the value of said physical characteristic signal; and means responsive to said varying speed control signal for generating the plurality of control signals at a rate adjusting in response to changes in the value of said varying speed control signal to define a forming cycle time for the machine.

2. The control means according to claim 1 wherein said source of a signal representing a physical characteristic of the gobs of molten glass is a temperature sensor.

3. The control means according to claim 2 wherein said temperature sensor is located within a forehearth of the means for forming gobs of molten glass.

4. The control means according to claim 1 wherein said varying speed control signal is a clock pulse train having a frequency proportional to the value of said physical characteristic and said means for generating the control signals is responsive to said clock pulse train for defining the forming cycle time for the machine.

5. The control means according to claim 4 wherein said means for generating the speed control signal as a clock pulse train includes a source of a machine cycle speed signal, and means responsive to said machine cycle speed signal for generating said clock pulse train at a predetermined rate and responsive to the physical characteristic signal for changing said predetermined rate in proportion to the value of the physical characteristic.

6. The control means according to claim 1 including a source of a signal representing the actuation of one of the forming means and wherein said means for generating the control signals is responsive to said actuation signal for adjusting the timing of a corresponding control signal in the forming cycle.

7. The control means according to claim 1 wherein said means for generating the speed control signal is a digital computer.

8. The control means according to claim 1 wherein said means for generating the control signals are a plurality of digital computers individual to each individual section.

9. In a glassware forming machine having means responsive to a speed control signal for forming and distributing gobs of molten glass to a plurality of individual glassware forming sections, glassware forming means in each of the individual sections for forming glassware articles from the gobs of the molten glass in a series of predetermined forming steps in response to a plurality of control signals, and control means for generating the speed signal and the control signals, the control means comprising:

a source of a signal representing a physical characteristic of the gobs of molten glass;

a system control unit responsive to said physical characteristic signal for generating a speed control signal varying in respose to changes in the value of said physical characteristic signal; and a sectional control unit individual to each of the forming sections and responsive to said varying speed control for generating the plurality of control signals at a rate adjusting in response to changes in the value of said varying speed control signal to define a forming cycle time for each individual section.

10. The control means according to clam 9 wherein said system control unit generates said speed control signal at one of a plurality of predetermined values in response to said physical characteristic signal.

11. The control means according to claim 9 including a source of a signal representing the actuation of one forming means of one of the individual sections and wherein said sectional control unit associated with said one individual section is responsive to said actuation signal for adjusting the timing of said one forming means in the forming cycle of said one individual section.

* * * * *